Jan. 26, 1954  A. ERNST  2,667,065
DEVICE FOR TESTING THE HARDNESS OF METALS
Filed July 25, 1950
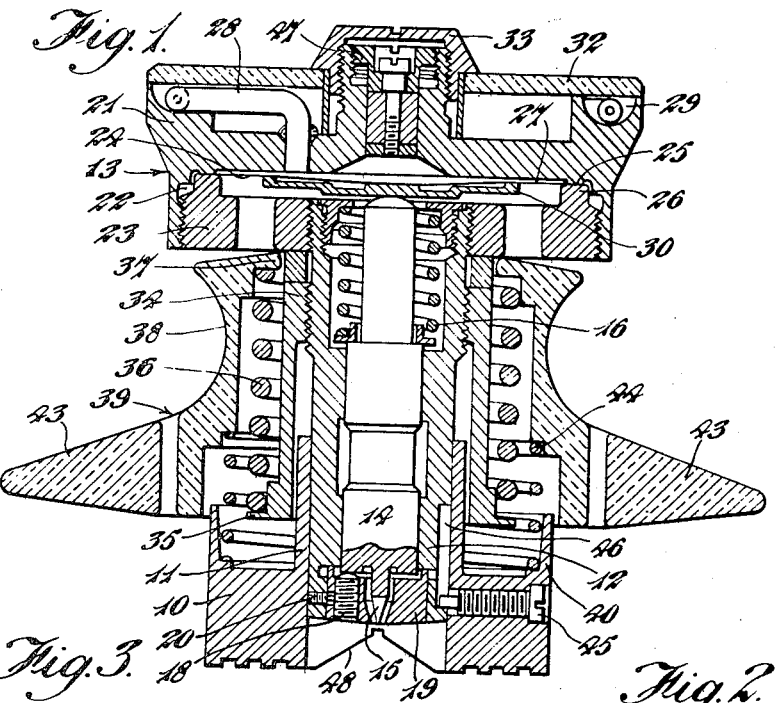
Inventor
Alfredo Ernst
by Stevens, Davis, Miller & Mosher
his attorneys Patented Jan. 26, 1954

2,667,065

UNITED STATES PATENT OFFICE 2,667,065

DEVICE FOR TESTING THE HARDNESS OF METALS

Alfredo Ernst, Milan, Italy

Application July 25, 1950, Serial No. 175,829

Claims priority, application Great Britain July 27, 1949

3 Claims. (Cl. 73—81)

This invention relates to devices for testing the hardness of metals, of the kind, of which an example is described in the specification of my British Patent No. 627,745, in which a plunger is pressed manually against the surface of the metal to be tested, and an indentor associated with the plunger is subjected to a predetermined pressure which produces a degree of penetration of the metal depending on the hardness, so that the position of the indentor relative to the plunger is a measure of the said hardness, means being provided for indicating such position on a scale.

The object of the present invention is to provide a device of the kind referred to in which the reading obtained is substantially unaffected by the degree of pressure applied by the operator.

According to the present invention, in a device of the kind referred to for testing the hardness of metals resilient means are provided through which the pressure is applied to the plunger, said resilient means being arranged to transmit without yielding a maximum pressure only slightly greater than the predetermined pressure applied to the indentor.

The resilient means preferably comprises a prestressed coil spring.

The invention is hereinafter described with reference to the accompanying drawings, in which:

Figure 1 is a vertical section through one form of device according to the invention;

Figure 2 is a partial vertical section taken at right angles to that shown in Figure 1; and Figure 3 is a plan view.

Referring to the drawings, the device comprises a circular base 10 with which is integrally formed an upstanding sleeve 11 in which is slidably mounted a plunger 12. The plunger carries at its upper end a head generally indicated at 13, and an indentor 14 having a point 15 at its lower end is mounted slidably in a co-axial bore in the plunger 12, the indentor 14 being urged downwardly with respect to the plunger 12 by a spring 16 which exerts a predetermined load on the said indentor. Downward movement of the indentor is limited by an adjustable stop in the form of a grub-screw 18 mounted in a block 19 of hardened steel let into the lower end of the plunger and held in position by a grub screw 20, the stop so positioning the indentor that its point 15 projects a small distance below the plunger.

The head 13 comprises a part 21 having a recess 22 on its underside, the recess being closed by a disc 23 which is screw threaded on its edge to engage a screw thread on the circumferential wall of the recess, and has a screw-threaded central aperture to receive the screw-threaded upper end of the plunger 12. A flexible diaphragm 24 is clamped between annular ribs 25 and 26 formed in the recess 22 and on the disc 23 respectively, and constitutes a movable lower wall for a liquid chamber 27 to which is connected a tube 28 of small bore, the tube, which is of transparent material such as glass, being so shaped as to lie in an annular groove 29 extending around the upper surface of the head 13. The liquid chamber is filled with liquid, which extends into the tube, the other end of the tube having a restricted opening to the atmosphere.

The upper end of the punch 14 bears against a rigid metal disc 30 which is soldered to the underside of the diaphragm, and it will be seen that relative movement of the punch 14 and the plunger 12 will cause a change in volume of the liquid chamber 27, thus producing a movement of liquid in the tube which can be measured on a scale 31 engraved on the underside of a cover 32 of transparent plastic moulding material clamped to the head by a central screw-cap 33.

A sleeve 34, internally screw-threaded at its upper end, is screwed at that end on to the plunger, the sleeve 34 extending downwardly around the sleeve 11 of the base, and having an external flange 35 at its lower end to provide an abutment for the lower end of a coiled spring 36. The spring 36 engages at its upper end with an internal flange 37 on the body part 38 of a manual pressure member 39, the body part 38 being of tubular form and extending downwardly around the base 10. The spring 36 urges the body part 38 of the manual pressure member upwardly against the underside of the disc 23, and is compressed during assembly of the device to such a degree that it yields to permit the part 38 to move away from the disc 23 when a pressure slightly greater than that needed to compress the spring 16 is exerted on the manual pressure member. Downward movement of the manual pressure member is limited by an upwardly-projecting rim 40 on the base 10, the arrangement being such that this rim 40 is engaged by the manual pressure member before the spring 36 is fully compressed.

The manual pressure member includes, in addition to the body part 38, a part 41 which is pivotally attached to the body part by means of set screws 42 screwed into the part 38 and having non screw-threaded extensions 42a which enter holes in the body part 38, the pivot axis of the part 41 being perpendicular to, and intersecting the axis of the plunger 12. The part 41 has two opposite laterally projecting wings 43 the centre line of which is perpendicular to the pivot axis of the part.

A third spring 44 arranged between the base 10 and the body part 38 of the manual pressure member urges the manual pressure member and plunger upwardly with respect to the base, such upward movement being limited by a stop screw 45 mounted in the base and projecting into a slot 46 in the plunger.

A screw-threaded plug 47 mounted in the head 13 below the screw-cap 33 provides a means for varying the volume of the liquid chamber 27 to adjust the zero reading of the device.

The base, plunger, head and sleeve of the device are conveniently made of steel, whilst the parts of the manual pressure member may be of brass or other metal, or may be moulded in a synthetic resinous moulding product.

In use, the base of the device is placed on the surface of the material the hardness of which is to be determined and pressure is applied by the operator's hands to the wings 43 of the manual pressure member, thus pressing the plunger 12 down into contact with the surface of the material. The pressure exerted on the plunger is limited by the spring 36. The indentor 14, being urged downwardly relative to the plunger by the spring 16, penetrates the material to an extent dependent on the hardness of the latter. The loading of the spring 16 is such that the degree of penetration of the indentor into the material is less than the initial projection of the indentor beyond the end of the plunger, and the plunger 12 therefore moves downwardly relative to the indentor to make contact with the surface of the material by a distance equal to the difference between the initial projection of the indentor and the distance of penetration. The volume of the liquid chamber 27 is thus decreased by an amount dependent on the degree of penetration, and the column of liquid in the tube 23 is increased in length, the increase being readable on the scale, which is calibrated in accordance with any desired scale of hardness measurement.

The base 10 is provided with a diametral groove 48 on its underside to locate the device on curved surfaces.

It will be understood that if the spring 36 were not included, the operator would be dependent entirely on his own judgment for determining what pressure was being exerted on the plunger, and he would not be sure that the plunger was in fact in contact with the material being tested, or whether he was exerting such a high pressure that the plunger itself was producing slight indentation of the material. With the arrangement according to the present invention the operator can safely exert the maximum pressure of which he is capable, the spring 36 yielding when the desired pressure on the plunger is exceeded.

What I claim is:

1. A device for testing the hardness of metals comprising a plunger, means for applying manual pressure to said plunger to press one end thereof against a metal surface of which the hardness is to be tested, an indentor reciprocably mounted within said plunger, first resilient means interposed between said plunger and said indentor and urging said indentor to a position in which it projects from the said end of the plunger, indicating means operated by relative movement of the indentor and plunger, and second resilient means interposed between the plunger and the manual pressure applying means, both said springs being preloaded, said second resilient means being preloaded in an amount sufficient to transmit, without yielding, a maximum thrust slightly greater than the load exerted on the indentor by the first resilient means.

2. A device for testing the hardness of metals comprising a plunger, means for applying manual pressure to said plunger to press one end thereof against a metal surface of which the hardness is to be tested, an indentor reciprocably mounted within said plunger, a first coiled spring interposed between said indentor and said plunger and urging said indentor to a position in which it projects from the said end of the plunger, indicating means operated by relative movement of the indentor and plunger, and a second coiled spring interposed between the plunger and the manual pressure applying means, both said springs being preloaded, said second coiled spring being preloaded in an amount sufficient to transmit without yielding a maximum thrust slightly greater than the load exerted on the indentor by the first resilient means.

3. A device for testing the hardness of metals comprising a base, a plunger slidably mounted in said base, an indentor slidably mounted in said plunger, first spring means interposed between said plunger and said indentor and acting to urge said indentor downwardly with respect to said plunger, indicating means carried by said plunger and operated by relative movement of the plunger and indentor, manual pressure applying means including a sleeve surrounding said plunger, second spring means interposed between said plunger and the manual pressure applying means, both said springs being preloaded, said second spring means being preloaded in an amount sufficient to transmit without yielding a maximum thrust slightly greater than the load exerted on the indentor by the first spring means, and third spring means interposed between said base and said manual pressure applying means acting to lift said means and said plunger relative to said base.

ALFREDO ERNST.

References Cited in the file of this patent

UNITED STATES PATENTS

| Number | Name | Date |
|---|---|---|
| 1,457,214 | Davis | May 29, 1923 |
| 2,536,632 | Ernst | Jan. 2, 1951 |

FOREIGN PATENTS

| Number | Country | Date |
|---|---|---|
| 280,292 | Great Britain | Nov. 14, 1927 |
| 298,662 | Great Britain | Oct. 12, 1928 |
| 239,409 | Switzerland | Jan. 16, 1946 |